INVENTOR.
WILSON S. GEISLER, JR.

FIG. 4

INVENTOR.
WILSON S. GEISLER, JR.

FIG. 5

United States Patent Office 3,730,776
Patented May 1, 1973

3,730,776
ELECTRIC CURRENT GENERATOR AND METHOD USING CONSUMABLE ALKALI METAL ANODE
Wilson S. Geisler, Jr., Saratoga, Calif., assignor to Lockheed Aircraft Corporation, Burbank, Calif.
Filed Feb. 4, 1970, Ser. No. 8,606
Int. Cl. H01m 17/02, 27/30
U.S. Cl. 136—100 R                    12 Claims

ABSTRACT OF THE DISCLOSURE

The effective generation of high electrical currents is provided utilizing materials which are highly electrochemically reactive with one another, such as sodium and water. The materials are continuously fed together into a very thin, low resistance electrochemical junction between conductive surfaces and moved relative to one another to continuously rapidly remove chemical reaction products from the electrochemical junction. A mechanical energy output may be provided by an integral electrical generator-motor.

---

The present invention relates to a method of generating electricity at high rates electrochemically in a thin dynamic electrochemical junction and to energy sources utilizing this method.

Conventional fuel cells and batteries have limitations in their available power output, particularly their available power output per unit weight and per unit volume, which limit their utilization in many applications. Their internal cell specific resistances are substantial, and they do not have the ability to effectively utilize light-weight, highly reactive electrochemical materials, especially the very active metals, even though such materials have been available for many years. Conventional fuel cell and battery art teaches the limiting necessity of separators, spacers, membranes, or porous barriers between the cell electrodes to prevent electrical shorting and to prevent direct combination of reactive chemicals, particularly where highly reactive materials are utilized. A recent example is shown in U.S. Pat. No. 3,449,165 issued June 10, 1969, where liquid sodium and sulphur are separated by a porous ceramic barrier. Various attempts have been made over the years to achieve a desired higher current and power density from batteries or fuel cells within the limitations of otherwise conventional electrode spacings and configurations, as by stirring the electrolyte or moving or brushing the electrodes to disperse some of the electrochemical reaction products from the electrodes. Exemplary arrangements therefor are shown by U.S. Pats. Nos. 316,436, 316,437, 650,014, 717,394, 719,660, 719,661, 734,547, 734,548, 2,710,371, 3,432,354, and 3,432,420. Yet none of these prior art developments have achieved the desired current rates power per unit weight ratios and other advantages of the present invention.

The electrical energy source and method of the invention provides a unique cell configuration which dispenses with the necessity of mechanical spacers or barriers between the electrodes, provides an extremely thin low resistance electrochemical junction and electrolyte layer without shorting, and permits the effective use of highly reactive materials. It provides very high rates of current and power generation, in excess of 200 amps. per square centimeter of electrode area at 80 watts per square centimeter of electrode area, which is orders of magnitude greater than conventional fuel cells or batteries. Further, the present invention provides good efficiencies at such high output current and power density levels, in contrast to conventional batteries or fuel cells. The electrochemical reactions are readily controlled by a variety of simple control arrangements and provide electrochemical, rather than thermal, reactions. Mechanical spacers, membranes or other barriers for physically separating the electrodes from shorting are not required. Instead a dynamic thin film electrochemical junction is provided, utilizing only the electrodes and their reaction products, in which the electrodes are merged together and a self-generated and self-regulating thin dynamic electrolyte barrier prevents electrical shorting between the electrodes, but provides an extremely low resistance. The present invention also allows the use of electrode materials which are good electrical conductors, readily available, light-weight and inexpensive. The high power density, mechanical simplicity, and utilizable materials allow an electrochemical energy device with extremely high output of power per unit volume and unit weight in comparison to presently available electrochemical energy sources.

The invention further teaches a simple integral fuel cell-motor for providing a direct mechanical output. The electrical motor has a matching impedance with the current generator, does not require any windings and provides a high output power to weight ratio. Very simple electrical motor configurations may be utilized, for example, the unipolar type illustrated in the text "Principles of Electricity," by Leigh Page, D. Van Nostrand Company, Inc., Second Edition (1949), pp. 310–315.

In the present invention electricity is generated at a high rate electrochemically with materials which are electrochemically reactive with each other, wherein one reactive material is supplied in a thin film contacting a surface area of another reactive material to form a thin electrochemical junction at which electrical current at a high current density is generated along with the chemical reaction products. The electrochemically reactive materials are moved relative to one another at the junction to provide for the rapid removal of the reaction products from the junction, while maintaining contact between the two materials. The two materials are continuously replenished at a controlled rate at the junction.

Further objects, features and advantages of the invention pertain to the particular arrangements and structure whereby the above-mentioned aspects of the invention are attained. The invention will be better understood by reference to the following description and to the drawings forming a part thereof, wherein:

Figure 1:
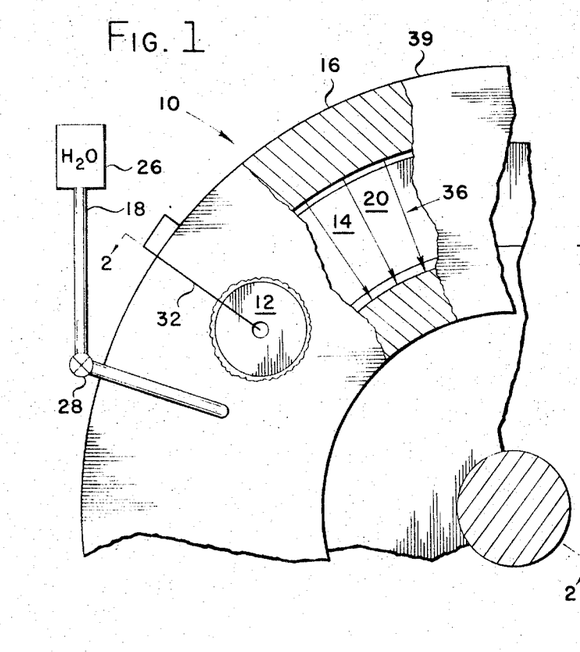
FIG. 1 is a partially broken-away partial side view of a first embodiment in accordance with the present invention of an electrochemical energy source.
Figure 2:
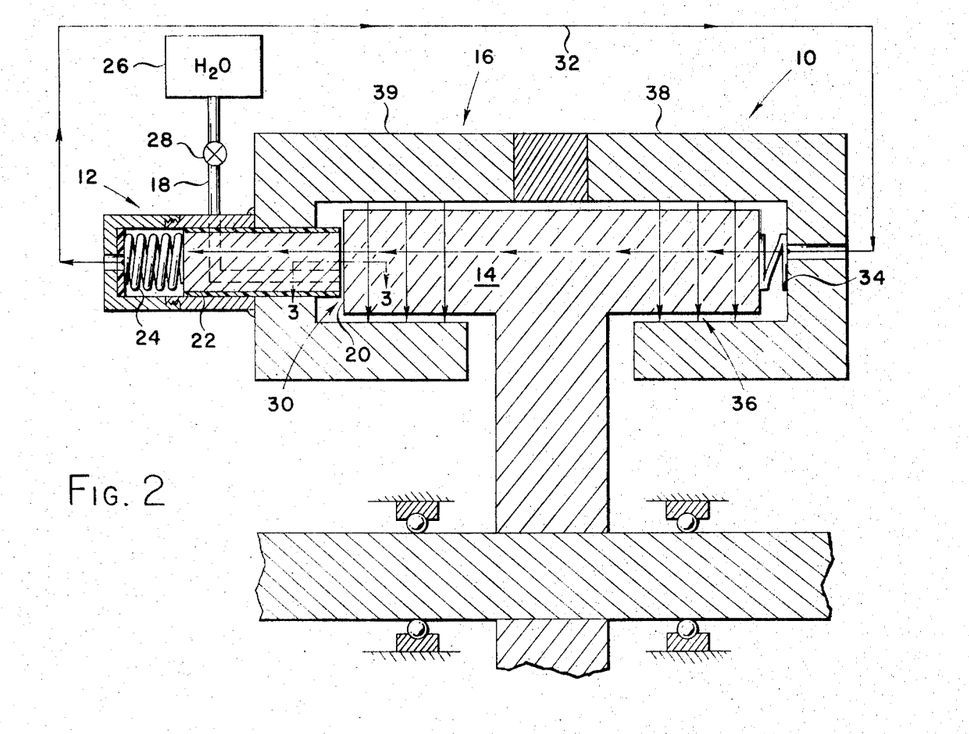
FIG. 2 is a cross-sectional view of the embodiment of FIG. 1 taken along the line 2—2 of FIG. 1.
Figure 3:
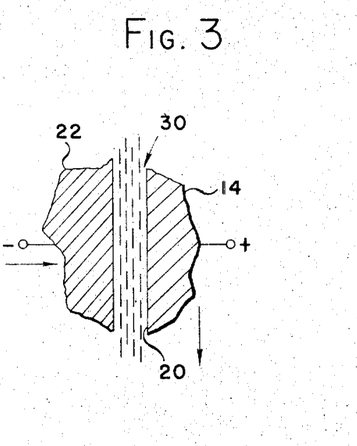
FIG. 3 is an enlarged partial cross-sectional view of the electrochemical junction taken along the line 3—3 of FIG. 2.
Figure 4:
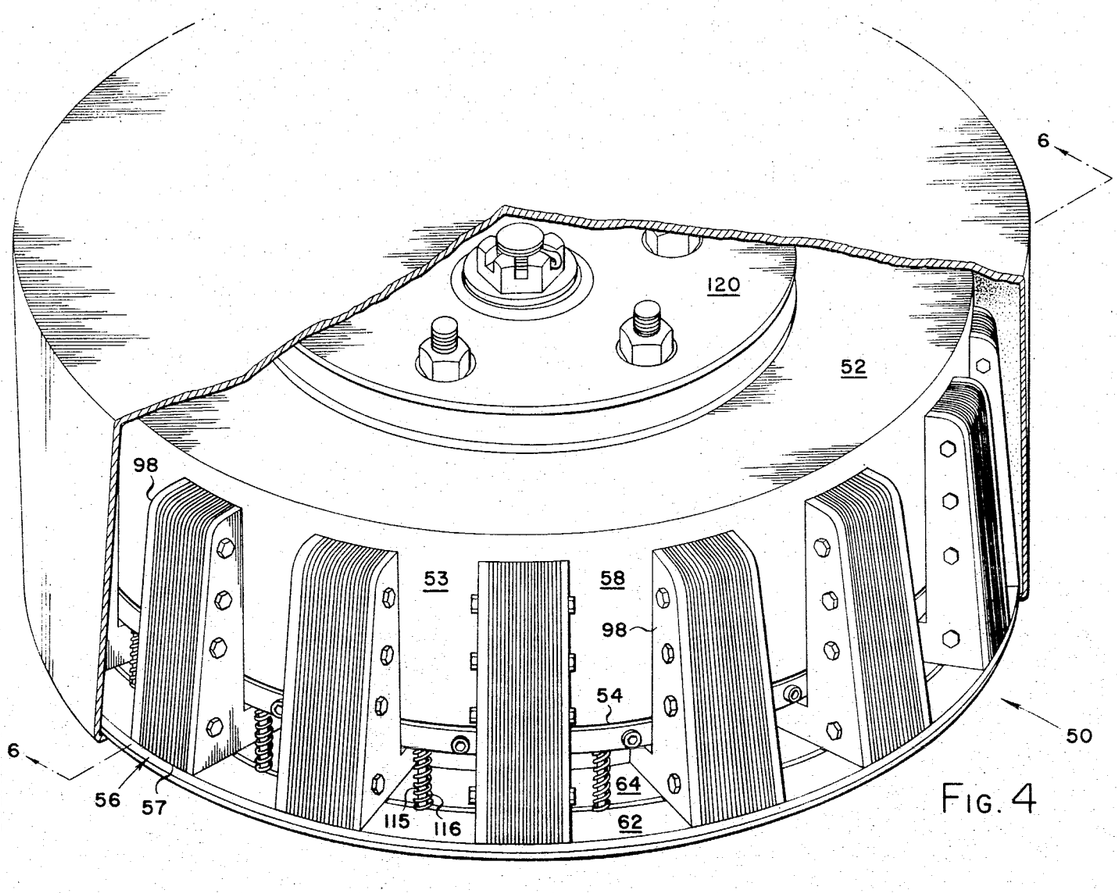
FIG. 4 is a perspective view of a second embodiment of the present invention.

Referring first to FIGS. 1–3 there is shown therein a first exemplary energy source 10 in accordance with the present invention. The discussion hereinbelow of the energy source 10 is also applicable as to the basic concepts and steps involved to a second exemplary energy source 50 shown in FIGS. 4–7 and described later.

The energy source 10 includes a feed assembly 12 for feeding a first electrochemically reactive material (sodium 22) against an electrically conductive surface area 20 of a rotor 14 having a second reactive material (water) thereon. The rotor 14 is mounted for rotation with respect to a stator 16. A thin electrochemical junction 30 is formed between the rotor surface 20 and the (conductive) sodium 22. Water is supplied in a thin film to the rotor surface 20 from an aqueous fluid supply means 18 to react with the surface of the sodium 22 facing the rotor surface 20. The sodium 22 and the water on the rotor surface 20 are moved relative to one another by the rotation of the rotor 14.

Referring particularly to the exemplary feed assembly 12, shown in FIG. 2, it may be seen that feed assembly 12 is adapted to contain and continuously feed the metallic sodium 22 (or other suitable electrochemically reactive materials) toward the smooth solid surface 20 of one side of the rotor 14 as the sodium is consumed, so as to maintain a continuing contact between the sodium and the water on the surface 20. The feed assembly 12 is preferably mounted to the stator 16. The sodium 22 is shown here in the form of a segment of a plastic sheathed sodium cylinder. It is commercially available in this configuration as electrical cable. The segment of sodium 22 is axially slideable within the feed assembly 12 toward and away from the surface 20. A spring 24 is provided under compression behind the segment of sodium 22 to continuously urge it toward direct engagement with the surface 20 of the rotor 14. When the entire segment of sodium 22 is consumed in the electrochemical junction 30 a new segment of sodium 22 may be provided by opening the feed assembly 12 and inserting the new segment therein.

Referring to FIGS. 1 and 2 it will be appreciated that as many feed assemblies 12 as are desired may be provided by spacing them radially around the surface of the stator 16. The desired number will depend on the desired output, which is a function of the surface area of the sodium overlying the surface 20.

The water supply means 18 here includes a tank 26 or other conventional storage means. Water from tank 26 passes through a valve 28 which controls its rate of flow, and the water is discharged directly upon the surface of the rotor 14. The water supply means 18 has its outlet located on the stator at a position where the water will spread out and completely overlie the portion of the surface 20 in the path of the sodium 22. The water forms a thin coating or film on the surface 20 of the rotor 14 and the rotor 14 carries this film of water between the end surface of the sodium 22 and the rotor surface 20. Thereby the water forms a thin film over the end surface of the sodium 22 and creates the electrochemical junction 30 in which the sodium and water react to produce electricity at a high rate, plus chemical reaction products, which in this case are sodium hydroxide and hydrogen.

The continuing rotation of the rotor 14 continuously supplies fresh water into the junction 30 and continuously removes the electrochemical reaction products therefrom. The relative movements at the electrochemical junction 30 are illustrated in FIG. 3, which represents a greatly enlarged view taken along line 3—3 of FIG. 2.

After the moving thin film of water on the surface 20 of the rotor 14 removes the reaction products from each electrochemical junction 30 these reaction products may be removed from the energy source 10 simply by spaced passageways between the rotor 14 and the stator 16 which allow the reaction products to discharge from the rotor 14. Storage may readily be provided for the discharged aqueous sodium hydroxide solution. Complete removal of the sodium hydroxide from the surface 20 is not necessary as the film of water on the surface 20 may contain a substantial solution of sodium hydroxide without serious impairment of the efficiency of the electrochemical junction 30. If the energy source 10 is operated submerged in water the sodium hydroxide can be simply dissipated in the surrounding water.

The surface 20 is preferably a uniform, continuous, smooth conductive surface, not reactive with the sodium, the water, or the sodium hydroxide or hydrogen reaction products. That is, it provides electron transfer but does not otherwise enter into a chemical reaction. As the reaction products are basic rather than acid there is no problem is the rotor 14 and surface 20 being constructed from any suitable metal. Preferably, the surface 20 should not be formed of a metal possessing high overpotential for hydrogen evolution (e.g., mercury). It is also preferable that the surface 20 and the rotor 14 are constructed of a metal having good electrical conductivity since in this embodiment the rotor 14 provides part of the electrical current conductor means for conducting away the generated current from one side of the electrochemical junction 30 through the surface 20. For the motor configuration herein the rotor 14 is also preferably a good magnetic field conductor. The surface 20 may also be porous if it is desired to supply water or other reactive materials onto the surface 20 through the rotor 14.

The sodium and water, on the other hand, are spontaneously reactive with each other. In fact, an uncontrolled combination of these two components will vigorously react to dissipate energy thermally rather than electrochemically. Accordingly, the use of such highly reactive components had previously appeared not feasible for effective electrical power generation, except with nonaqueous electrolytes, porous barriers or other limiting constraints. However, with the method and apparatus of the invention a safe and efficient high power electrochemical generation can be accomplished with diminished amounts of energy dissipated thermally.

As the active face of the soft sodium 22 is mechanically fed into the junction 30 it is constantly polished by the chemical reaction of the dynamic thin film of water on the surface 20 so as to provide and continuously maintain a very flat smooth surface on the sodium as it is consumed, contrary to the typical very irregular corrosion in the surface of stationary electrodes. The active surface of the sodium is believed to be molten, and hence very smooth, due to the local heating from the chemical reaction during operation.

As to the water, all but a very thin film of water directly adhering to the rotor surface 20 is wiped away by the sodium 22 surface pressing against the surface 20. The sodium reacts rapidly with this water to provide a layer of sodium hydroxide which overlies the sodium metal and prevents any significant localized electrical shorting, i.e., the thin sodium hydroxide and water layer on the reacting end of the sodium prevents any significant direct electron conduction between the sodium and the surface 20. Yet this sodium hydroxide dissolved in the thin dynamic film of water provides a very low resistance, thin electrolyte layer between the sodium and the surface 20.

The feed pressure on the sodium 22 from the spring 24 may vary substantially, although it must not be too heavy or there will be insufficient buildup of the layer of of sodium hydroxide at the reacting surface and localized shorting (metal to metal contact) may occur temporarily with surface 20. However, the sodium hydroxide forms readily and any localized shorting terminates automatically upon an appropriate reduction in the feed pressure. Thus, the sodium feed here is self-regulating.

The distance between the sodium surface and the surface 20 for maximum output current is between 0.10 and 0.13 millimeters. If this distance is greater than 0.13 mm. the efficiency is greatly lowered. Localized shorting begins to occur at junction thicknesses substantially smaller than 0.025 mm., depending on the surface characteristics of the wheel. Although this distance is very small and critical, it is self-regulating and self-maintaining.

The necessity for establishing the above small junction thickness may be understood in terms of the competing reactions for (1) the desired electrochemical reduction of water at the cathode (rotor surface 20) as contrasted to (2) the undesired reduction of water at the active metal (sodium) anode surface. The intrinsic rates for this second reaction are high; consequently it is necessary to draw appreciable current through the external load if there is to be established flow of electrons into the cathode to support high rates of water reduction by this first reaction (electron transfer at the cathode/electrolyte interface). Only when the rate of this first reaction exceeds the second can the electrochemical efficiency of the active metal utilization be large. This important condition of high electrical current through the load cannot be realized, however, if the internal resistance of the electrochemical junction is too great, i.e., if the junction thickness is excessive. If either this resistance through the electrolyte or the load resistance is large, the effect of bringing the water or electrolyte into contact with the active metal will be essentially only the direct chemical erosion of the active metal to liberate the chemical reaction products and heat, with little electrical power being extractable. Yet the junction must not allow electrical shorting. The structure and method of the invention satisfies these interrelated conditions to achieve high electrical power extraction from reactive metals.

The buildup of additional sodium hydroxide and hydrogen gas, which would otherwise form a barrier and greatly increase the electrical resistance of the junction, is prevented by the rapid product removal achieved by the relative rotation between the sodium and the surface 20. The rapid movement of the thin film of water on the surface 20 past the sodium surface provides a rapid dissolving and removal of all reaction products.

The thinness of the electrochemical junction 30 and the high thermal conductivity of both the sodium and the surface 20 provides a very low thermal resistance from and through the junction 30. The cooling effectiveness is further assisted by the fact that only a portion of the surface 20 is overlayed by a junction 30 at any given time. As the surface 20 moves out from under each of the junctions 30 it is exposed to the surrounding atmosphere for cooling. Accordingly, there is no difficulty in dissipating the thermal energy produced in the junction 30.

The plastic sleeve on the sodium 22 does not affect the reaction. It is removed in the junction 30 as the sodium is consumed.

The hydrogen generated as a reaction product in the junction 30 may also take part in an additional electrochemical reaction and add to the overall current generation. Where the energy source 10 is operated in the presence of oxygen, as in air, it has been observed that higher power densities are achievable.

When either the sodium feed or the rotation of the rotor 14 is stopped the exposed sodium surface seals itself with a layer of the reaction products, filling the small gap between the end of the sodium and the surface 20, and there is no significant further chemical activity. This is achieved almost instantaneously since only a single surface of the sodium is directly adjacent the surface 20 and exposed for reaction, and only the small quantity of water in the thin film overlying that sodium surface is present for reaction.

Very little energy is required to initiate or maintain rotation of the rotor 14 during operation of the energy source 10. The frictional forces are very low because the sodium hydroxide and water provide excellent lubrication between the sodium 22 and the surface 20. The rotational speed is not critical and does not significantly affect the current output as long as the rotor linear speed at the junction is above approximately 500 centimeters/second.

Where the energy source 10 is operated purely as an electrical generator, rather than as an integral generator motor, it will be appreciated that a conventional drive means may be provided for the small amount of energy required to rotate the rotor 14. Here the energy source 10 includes an integral electrical motor which provides this necessary rotation, as described hereinbelow.

The electrical current from the energy source 10 may be taken off directly and used in an external circuit by means of suitable electrical conductor connections. Here, for example, the current conductors at one pole include the spring 24 which engages and conducts between the stator 16 and the outside end of the sodium segment 22. The other pole or current takeoff is provided here by the surface 20 and the rotor 14. The generated low voltage D.C. curent is preferably utilized in a matching low impedance load. However, it may also be conventionally converted to a higher voltage A.C. current for transmission. Intermittent D.C. may be provided by an intermittently conductive surface 20. The coulombic or current efficiency which may be achieved, i.e., the percentage of the number of possible free electrons obtainable from the sodium, is approximately 99 percent.

The most appropriate output load for the electrical generation arrangement of the energy source 10 is a load utilizing the high current output at a low impedance matching the impedance of the junction 30. Accordingly, the method and apparatus of electrical generation herein is particularly suited to a single integral motor-generator energy source providing direct mechanical output at the shaft of the rotor 14. Further, this provides inherently for the necessary continued rotation of the rotor 14 during operation. The only auxiliary energy needed is a battery or other current generator to provide an initial starting current through the rotor 14 to initiate rotation of the rotor (or the rotor may be started mechanically or by hand).

The motor function in the energy source 10 is provided here by directly utilizing the electrochemically generated current from the junction 30 in a simple yet powerful Faraday motor arrangement, in which the large electrical current generated at the junction 30 is conducted directly through a low impedance rim portion of the rotor 14 at right angles to a permanent magnetic field 36, thereby generating rotor torque and output power. It will be appreciated, of course, that the electrical output from the electrochemical reaction can also be used to power a conventional low impedance D.C. motor, which may or may not be an integral part of the mechanism which extracts the pouer from the electrochemical reaction.

Considering in further detail this motor operation, a schematic electron current path 32 is shoun in FIG. 2. It may be seen that the electron current is conducted from the sodium side of the junction 30 through the sodium 22 and spring 24. The current is then conducted through a suitable external conductor around to the surface of the rotor 14 opposite to the surface 20, entering through a hole in the stator. Thus the electron current path 32 does not cross any magnetic flux paths in the stator. The current is then transferred to the rotor 14 by a low resistance electrical brush 34 connection between the stator and the opposite end of the rotor 14. The current then is conducted back internally through the rotor 14 from one side to the other. Thus the current path 32 intersects and reacts with the magnetic field 36, which is radially oriented to pass internally through the rotor 14 at right angles to the current path 32 hrough the rotor. The magnetic field 36 is here provided by two identical "C" shaped permanent magnets 38 and 39 which are portions of the stator 16 surrounding the ends of the rotor 14. The interaction inside the rotor of the current through the rotor with the magnetic field 36 results in a rotation of the rotor 14 and he conversion of the generated electrical energy into a mechanical energy output at the shaft of the rotor 14.

It may be seen from the above that a very short and low impedance closed circuit conductive path is provided here for the generated current. The desired low electrical load resistance is readily accomplished since no windings or coils are required, and since large cross-sectional area conductors are provided by direct conduction through the full cross-sectional area of the stator 16 and the end of the rotor 14.

Concerning next the energy source 50, shown in FIGS. 4-7, this is a second embodiment in accordance with the present invention. The energy source 50 is basically similar to the energy source 10 in its structure, function and method of operation. It differs primarily in being a more sophisticated structure designed for a higher efficiency, a higher power output to weight ratio, and the use of electrode material in liquid or extruded form.

The energy source 50 includes a rotor 52 of magnetically conductive material with a radially extending annular flange portion 53. The rotor 52 is rotatably mounted to a stator 54. As seen particularly in FIG. 4, a plurality of U-shaped identical and independent feed heads are spaced circumferentially around the outer edge of the stator 54 so that the flange 53 of the rotor 52 rotates through all of these feed heads. Each feed head provides a plurality of passageways for the introduction of the sodium and water, or other electrode material, to the electrochemical junction at the rotor flange surface, and the removal of the reaction products.

Figure 5:
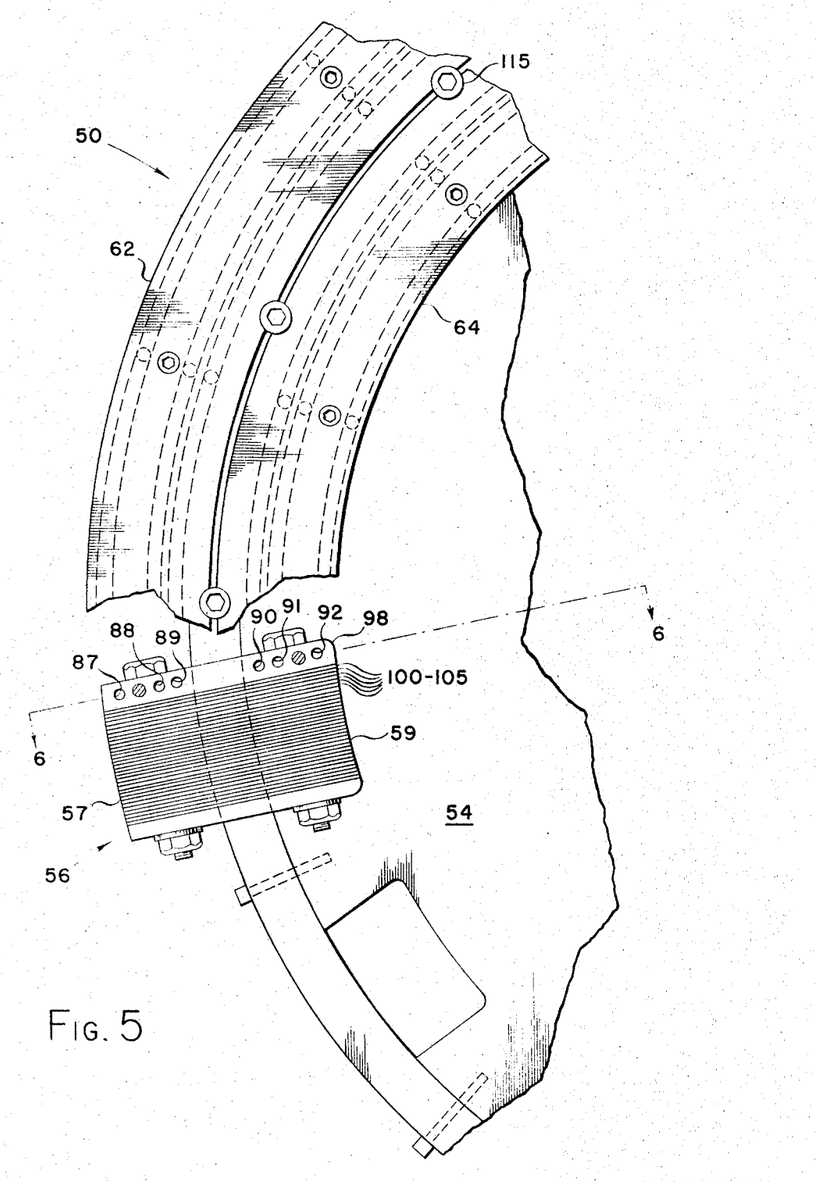
FIG. 5 is a bottom view, partially broken-away, of the embodiment of FIG. 4.
Figure 6:
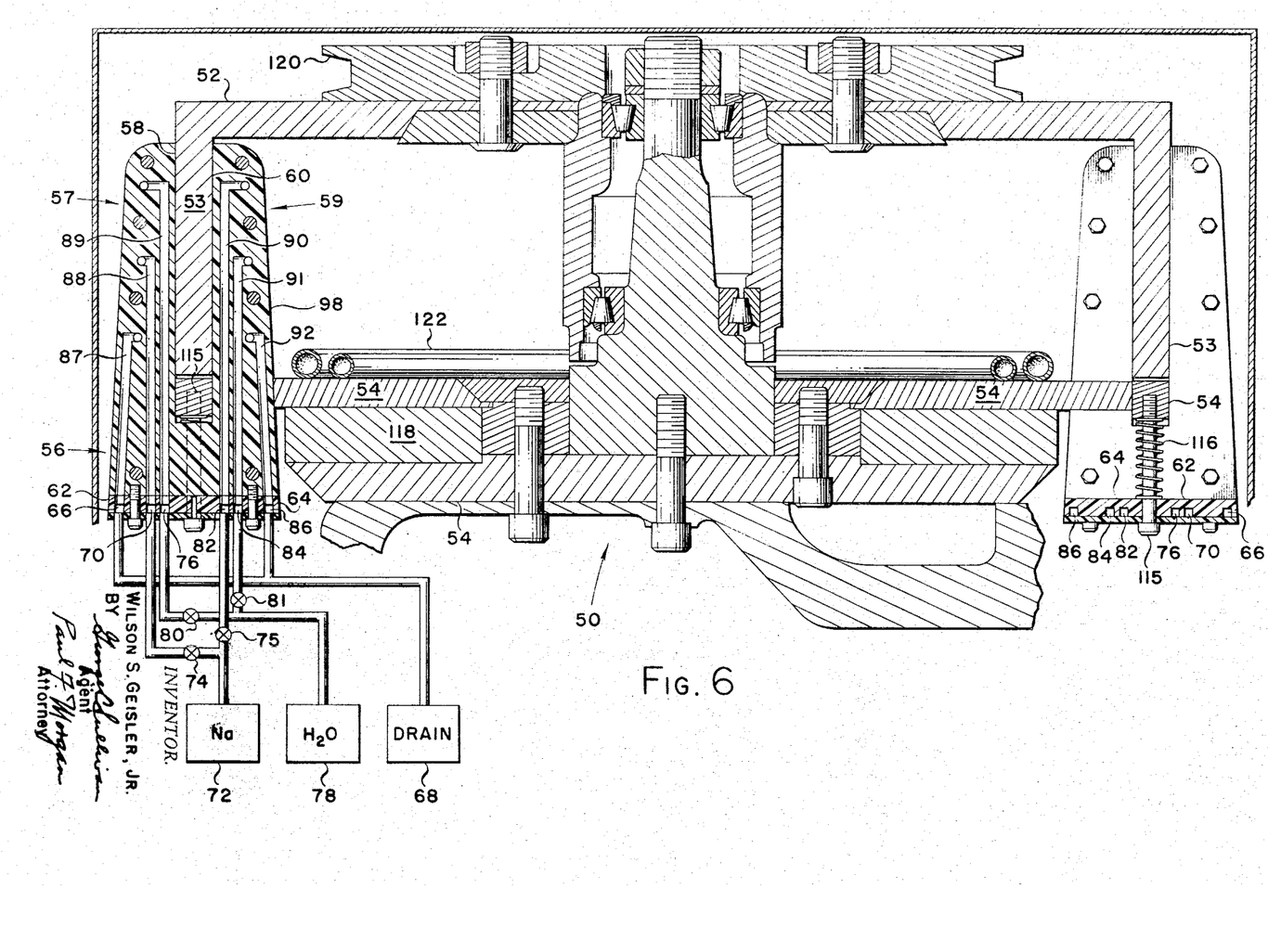
FIG. 6 is a central cross-sectional view of the embodiment of FIG. 4 taken along the line 6—6 of FIGS. 4 and 5.
Figure 7:
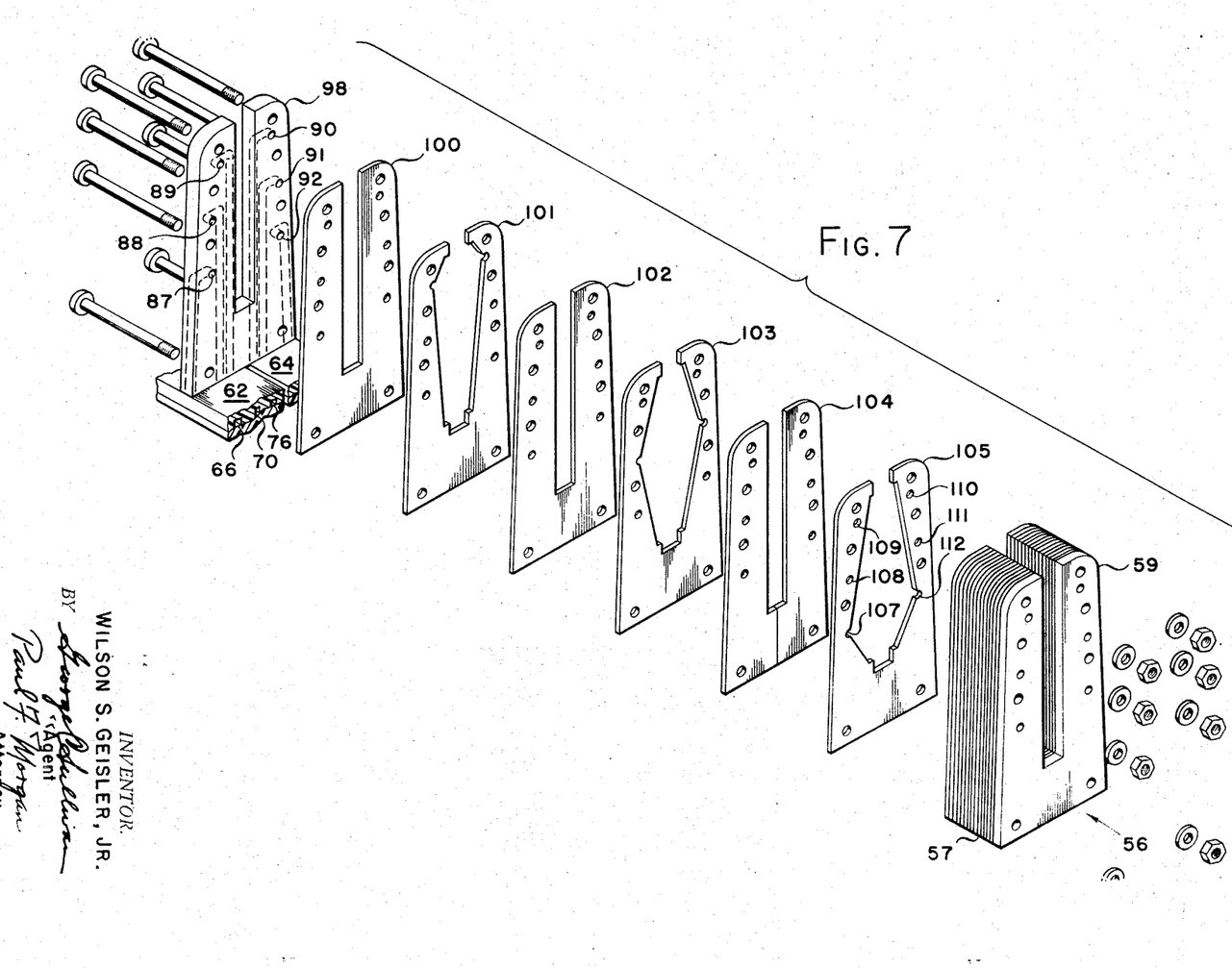
FIG. 7 is an exploded perspective view of an exemplary feed head of the embodiment of FIG. 4.

An exemplary feed head 56 is shown in an exploded view in FIG. 7, in cross-section on the left hand side of FIG. 6, and in a bottom view in FIG. 5. The feed head 56 is, in effect, two separate feed assemblies; an outside feed assembly 56 for an outside surface 58 of the rotor flange 53, and an inside feed assembly 59 for an inside surface 60 of the rotor flange (the surface 58 corresponds to the surface 20 of the energy source of FIGS. 1-3).

The feed head 56 is fed through an outer manifold 62 and an inner manifold 64, both in the form of annular rings connecting with the bases of all of the feed heads. As may be particularly seen at the lower left hand side of FIGS. 6 and 7, the outer manifold 62 provides water, sodium and reaction product removal for the outside feed assembly 57. The inner manifold 64 similarly provides for the inside feed assembly 59. The manifolds 62 and 64 are preferably of plastic, ceramic, or other suitable electrically insulative material and have continuous, annular enclosed channels therein for the conduction of the materials to and from the feed heads. Preferably the manifold materials have good thermal properties.

The supply of materials to and from the manifolds 62 and 64 is illustrated schematically at the lower left hand side of FIG. 6. From left to right the outer manifold 62 first has a drain channel 66 therein connecting by conventional tubing or the like to a conventional drain tank 68 into which the discharged sodium hydroxide solution may be stored. The outer manifold 62 next has a sodium channel 70 connecting with a suitable or conventional source of liquid sodium 72 under pressure through a valve 74 for controlling the rate of sodium flow. The third channel of the outer manifold 62 is a water channel 76 for conducting water from a suitable or conventional supply source of water 78 through a valve 80 for controlling the rate of water flow.

The inner manifold 64 is similarly arranged with a sodium channel 82, water channel 84 and drain channel 86 connected to the same drain tank 68, sodium source 62 through valve 75, and water supply 78 through valve 81. It may be seen that the number of channels in the outer manifold and inner manifold are the same, but that the sequence is different. The manifold channels 66, 70, 76, 82, 84, and 86 communicate underneath the feed head 56 respectively with feed passageways 87, 88, 89, 90, 91, and 92 in an end plate 98 of the feed head 56 for distributing the materials therein.

Referring particularly to FIG. 7, it may be seen that feed head 56 is here constructed from a thick insulative end plate 98 supporting a plurality of thin sheets of insulating or conducting material in a sequential configuration and held together in a laminate or sandwich structure. This laminate structure is utilized here for the feeding of the sodium and water out onto the surfaces 58 and 60 of the rotor 52 from narrow orifices. It will be appreciated that narrow orifices could also be provided by machined slots or other arrangements. It has been found that a more efficient electrochemical reaction may be obtained where the electrode material is extruded onto the rotor surface through a narrow elongate orifice extending transversely in the direction of movement of the rotor surface. Elongate orifices are provided here by thin sheet material with cut-away portions held between adjacent (overlying) sheets of material which is not cut-away.

This increase in efficiency with a narrow orifice (a short active metal contact distance) may be explained in terms of the fact that heat from the thermochemical side reaction is liberated at the sodium/electrolyte interface. The electrolyte temperature rises rapidly in this region because heat accumulates in the water as it moves across the sodium electrode face. An excessive temperature rise causes this water near the interface to boil. The boiling can form vapor gaps between the sodium electrode and the electrolyte, destroying local electrical continuity. In that case a reduced fraction of the electrode surface area participates in the electrochemical reaction. The result is an apparent decrease in maximum obtainable values of current density and power density as the width of the sodium feed slot is increased in the direction of the water movement, i.e., as the anode thickness increases. Sodium feed slot widths in the range 0.025 to 0.25 millimeters have been found to achieve significantly higher power densities than substantially wider slots.

In FIG. 7 there are shown six of the exemplary sheets 100-105 exploded from the remainder of the sheets in the feed head 56. This series of six sheets is repeated in the same order by additional identical sheets several times to form the laminated stack of sheets in the feed head 56. It may be seen that all of the sheets 100-105 have concentric apertures 107, 108, 109, 110, 111, and 112 extending therethrough, which apertures communicate respectively with the upper ends of the material feed passageways 87-92 in the end plate 98. Considering the passageway 88, for example, it may be seen that sodium passing through this passageway manifold (from channel 70) will pass out through the aperture 108 through all of the sheets of the feed head 56. It is not able to extend onto the rotor surface from the sheets 100, 101, and 102 since they are not cut-away or open at the aperture 108. However, as the sodium is passed through the sheet 103, it may be seen that sheet 103 is cut away to open the aperture 108 and allow sodium to freely pass out from the aperture 108 toward the outside surface 58 of the rotor 52. This opening is only the thickness of the sheet 103, as the adjacent overlying sheets 102 and 104 limit the opening onto the rotor surface.

It may be seen that the sheet 102 is formed so as to allow only water from the aperture 109 to be extruded out of a thin orifice onto the rotor surface. Likewise, the sheet 105 is cut away to the aperture 107 only so as to receive the reaction products.

It may be seen from the above that in the operation of the outside feed assembly 57 of the feed head 56 that in each sequence of six sheets water is supplied to the rotor surface in a thin layer through the sheet 101, sodium is extruded in a thin layer through the sheet 103 to react with the water at the rotor surface, and then the reaction products are drained through the sheet 105. Electrical current thereby generated is conducted by the sodium and the sheet 103 which is a conductor. Sheets 100, 101, 102, 105, and the outside half of sheet 104 are insulators (ceramic or plastic). Thus the sodium is extruded between insulative sheets to prevent an undesired local corrosion reaction with conductors in the feed head.

The inside feed assembly 59 here differs in structure and operation from the outside feed assembly 57. It in effect replaces the brush 34 of the energy source 10 by an additional current junction (electrochemical junction) at the inside rotor surface 60. The feed arrangement of sodium and water is reversed in the inside feed assembly 59 so that the voltage at this electrochemical junction adds to, rather than bucks, the junction with the outside feed assembly 57 at the (opposite) outside rotor surface 58. It will be appreciated that the inside feed assembly 59 is not essential and a conventional brush may be placed in its stead. Alternatively, a sodium brush can be provided by feeding sodium, but not water, to the inside feed assembly 59.

Referring to FIG. 7, sodium is extruded from sheet 101 (from aperture 110) directly onto the rotor surface 60. Water may then be applied in a thin layer from sheet 103 (from aperture 111) over the moving thin layer of sodium on the surface 60. The reaction products are removed through aperture 112 at sheet 105.

In the energy source 50 the magnetic field for rotor operation is provided by a permanent magnet 118 forming part of the stator 54, as shown in FIG. 6. The magnetic field therefrom is passed through the rotor 52 by conventional air gaps, one at the conventional central bearing mounting of the rotor and the other at the outer end of the rotor flange 53. Thus the rotor flange has a magnetic field extending therethrough for interaction at right angles with the electrochemically generated current. The current is conducted through the rotor flange 53 between the outside surface 58 and the inside surface 60. Accordingly, the rotor 52 is driven by the generated current in the same basic manner as the rotor 14 of the energy source 10. It will be appreciated that the rotor or stator, or both, can be constructed of permanent magnet material.

A V-belt pulley 120 is shown as a part of the rotor 52 as an exemplary means of mechanical power take-off. The initial starting rotation of the rotor may also be provided in this manner.

It may be seen that the sheets 100 through 105 and all of the accompanying sheets in the feed heads are mechanically supported by their rigid connection to the end plate 98. The end plate 98 is itself secured to the manifolds 62 and 64, so that the feed heads and manifolds are, in effect, a single unit. (However, the feed heads may be individually removed or replaced and are independent of each other in operation.) This feed head and manifold unit is adjustably mounted in the stator 54 by a plurality of adjustment screws 115, as may be particularly seen in FIG. 4 and in the right hand side of FIG. 6. The heads of the screws 115 support the manifolds and the threaded ends engage the stator 54. A spring 116 on each screw 115 under compression extends therebetween. Turning the screws 115 moves the feed heads toward or away from the stator 54, and accordingly toward or away from the rotor flange 53 thereabove. The rotor flange 53 is slightly tapered, and the interior surfaces of the feed heads have the same taper. Therefore, as the feed head moves upwardly it gradually fits more tightly against both of the surfaces 58 and 60 of the rotor flange 53. Also, it is automatically self-centering thereon.

A conventional heating coil 122 is shown in FIG. 6. This may be utilized for providing intial pre-heating of the energy source 50 where liquid sodium or other electrode materials requiring heat for flow are utilized. Once the energy source 50 is operating there is sufficient self-generated heat retained within its enclosing heat shield, and external heat is not required to sustain the apparatus at the desired temperature. Sodium, for example, is a liquid at slightly below the boiling point of water, and thus a conventional boiling water heat source may be utilized.

Various control devices and arrangements may be utilized with both of the energy sources 10 and 50. As previously stated, the current generation will stop upon stopping the rotor. The rate of current generation can be controlled by controlling the feed rates of the materials by the valves illustrated herein or any other desired arrangement. These controls do not require significant power, and have a rapid response since only the small portions of the materials which are to be immediately consumed are being introduced into the electrochemical junctions at any time. The vast bulk of the reactive materials are not in a position to react with each other and in fact may be remotely positioned from the apparatus, as shown in FIG. 6. Thus, there is little danger of uncontrolled reactions. The current generation may also be controlled by a suitable variable external (bucking) voltage.

Materials which are highly suitable with the present invention include sodium, potassium, lithium, or alloys or metallic solutions of these active metals. These materials are spontaneously reactive with water, and have water soluble ionic reaction products which form highly conductive electrolytes in water. They can be liquified at relatively low temperatures and used in liquid form, and in solid form they are sufficiently soft to be extrudable through narrow orifices at reasonable pressures. They are readily and inexpensively available and can provide a high power-to-weight ratio due to their light weight.

It may be seen that there has been disclosed herein a novel electrochemical method and energy source. It is contemplated that numerous variations and modifications may be made therein by those skilled in the art. The following claims are intended to cover all such variations and modifications as fall within the true spirit and scope of the invention.

I claim:
1. A high current energy source comprising:
a consumable alkali metal anode highly reactive with an aqueous electrolyte;
an electrochemically non-reactive low resistance electrically conductive cathode;
movable anode feed means urging said anode towards contact with said cathode for maintaining a gap of electrolyte therebetween of sufficient thinness to produce electrical energy and a low resistance path in said gap and to prevent an uncontrolled thermal reaction between said alkali metal oxide and the aqueous electrolyte;
aqueous fluid supply means for providing a rate of flow of aqueous electrolyte into said gap sufficient to produce electrical energy in said gap by the reduction of aqueous electrolyte in the gap by the anode alkali metal in the gap to form alkali metal hydroxide and hydrogen and electrical energy, all in said gap;
means for rotating said cathode transversely relative to said anode at a speed sufficient to remove from said gap alkali metal hydroxide produced by said reduction and to maintain a thin low resistance alkali metal hydroxide electrolyte layer in said gap;
and low resistance external circuit means connecting between said anode and said cathode.

2. The energy source of claim 1 wherein said gap is self-maintained solely by said aqueous electrolyte and said alkali metal hydroxide in said gap providing the sole spacing means between said anode and said cathode.

3. The energy source of claim 2 wherein said gap is a self-maintaining submillimeter spacing between said alkali metal anode and said cathode.

4. The energy source of claim 1 wherein said movable anode feed means comprises variable force means pressing said anode against said cathode with a variable force to provide a variable electrical energy output.

5. The energy source of claim 1 wherein said cathode has an essentially uniform surface and wherein said feed means includes a narrow elongate orifice transverse the direction of movement of said cathode surface and opening onto said surface for the introduction of said alkali metal anode through said orifice.

6. The energy source of claim 1 wherein said cathode is a part of said external circuit means and is adapted to conduct said electrical energy from said gap therein;
and further including magnetic means providing a magnetic field in said cathode electromagnetically interacting with said electrical energy to rotate said cathode.

7. The energy source of claim 5 further including heating means associated with said feed means for liquifying said alkali metal.

8. The energy source of claim 1 wherein said aqueous fluid supply means comprises means for applying water to said cathode at a position on said cathode where said roation of said cathode carries said water into said gap.

9. A method for producing high current electrical energy comprising the steps of:

urging a consumable alkali metal anode towards contact with an electrochemically non-reactive low resistance electrically conductive cathode while maintaining a gap of electrolyte therebetween of sufficient thinness to produce electrical energy and a low resistance path in said gap and to prevent an uncontrolled thermal reaction between said alkali metal anode and an aqueous electrolyte;

supplying aqueous fluid into said gap at a sufficient rate of flow to produce electrical energy in said gap by reducing aqueous electrolyte in the gap by the anode alkali metal in the gap to form alkali metal hydroxide and hydrogen and electrical energy, all in said gap;

rotating said cathode transversely relative to said anode at a speed sufficient to remove from said gap alkali metal hydroxide produced by said reduction and to maintain a thin low resistance alkali metal hydroxide layer in said gap; and drawing sufficient current in an external electrical current path between said anode and said cathode to support a high rate of aqueous reduction at the cathode.

10. The method of claim 9 wherein said aqueous fluid is supplied into said gap by applying water to said cathode at a position on said cathode where said rotation of said cathode carries said water into said gap.

11. The method of claim 9 wherein oxygen is additionally provided in said gap for reaction with said hydrogen generated therein, adding to the electrical energy generated therein.

12. The method of claim 9 wherein said alkali metal anode is urged only against a portion of said cathode to leave a substantial portion of said cathode outside of said gap at any given point in time in said rotaion of said cathode.

References Cited

UNITED STATES PATENTS

| | | | |
|---|---|---|---|
| 2,921,110 | 1/1960 | Crowley et al. | 136—86 A |
| 2,976,342 | 3/1961 | Morehouse et al. | 136—86 A X |
| 3,043,898 | 7/1962 | Miller et al. | 136—86 A |
| 3,141,796 | 7/1964 | Fay et al. | 136—86 E |
| 3,493,436 | 2/1970 | Johnsen | 136—86 E |
| 2,588,466 | 3/1952 | Barnes | 310—178 |
| 2,710,371 | 6/1955 | Baensch | 136—1 X |
| 2,925,455 | 2/1960 | Eidensohn et al. | 136—100 R X |
| 3,057,946 | 10/1962 | Eidensohn | 136—86 A |
| 3,163,792 | 12/1964 | Sayers | 310—219 X |
| 3,236,694 | 2/1966 | Stenger et al. | 136—100 R |
| 3,560,261 | 2/1971 | Stachurski et al. | 136—86 E X |
| 3,589,944 | 6/1971 | Stanemirovitch et al. | 136—86 R |
| 2,050,172 | 8/1936 | Gordon | 136—100 M |

ALLEN B. CURTIS, Primary Examiner